United States Patent
Gregory et al.

(10) Patent No.: US 6,983,593 B2
(45) Date of Patent: Jan. 10, 2006

(54) STIRLING ENGINE ASSEMBLY

(75) Inventors: Adam Richard Gregory, Coalville (GB); David Anthony Clark, Hugglescote (GB); Julie Patricia Hyde, Solihull (GB); David Michael Jennaway, Loughborough (GB)

(73) Assignee: Microgen Energy Limited, (GB)

( * ) Notice: Subject to any disclaimer, the term of this patent is extended or adjusted under 35 U.S.C. 154(b) by 63 days.

(21) Appl. No.: 10/483,950

(22) PCT Filed: Nov. 12, 2002

(86) PCT No.: PCT/GB02/05111

§ 371 (c)(1),
(2), (4) Date: Jan. 15, 2004

(87) PCT Pub. No.: WO03/042566

PCT Pub. Date: May 22, 2003

(65) Prior Publication Data

US 2004/0172942 A1    Sep. 9, 2004

(30) Foreign Application Priority Data

Nov. 14, 2001 (GB) .................................... 0127375
Feb. 8, 2002 (GB) .................................... 0203016

(51) Int. Cl.
*F02G 1/04* (2006.01)
(52) U.S. Cl. ................................ 60/517
(58) Field of Classification Search .......... 60/517, 60/519, 520, 524, 526
See application file for complete search history.

(56) References Cited

U.S. PATENT DOCUMENTS

| 1,976,901 | A | * | 10/1934 | Steenweg | ...................... 338/66 |
| 4,400,941 | A | | 8/1983 | Rauch | ........................ 60/520 |
| 4,694,650 | A | * | 9/1987 | Vincent | ....................... 60/520 |
| 4,742,679 | A | * | 5/1988 | Inoda et al. | .................. 60/517 |
| 4,811,563 | A | * | 3/1989 | Furuishi et al. | ............... 60/517 |
| 4,873,826 | A | * | 10/1989 | Dhar | ....................... 60/641.14 |
| 5,139,242 | A | | 8/1992 | Yarr | |
| 6,809,486 | B2 | * | 10/2004 | Qiu et al. | ................... 318/135 |

FOREIGN PATENT DOCUMENTS

| DE | 19958928 | 6/2001 |
| EP | 0 898 094 A2 | 2/1999 |
| JP | 58028035 | 2/1983 |
| JP | 63263250 | 10/1988 |

* cited by examiner

*Primary Examiner*—Hoang Nguyen
(74) *Attorney, Agent, or Firm*—Needle & Rosenberg, P.C.

(57) ABSTRACT

A Stirling engine assembly for a DCHP system. A Stirling engine (1) is suspended from a mounting frame (5) by a plurality of tension springs (6). An annular absorber mass (2) surrounds the Stirling engine and is suspended from the engine on a plurality of resilient members (3) arranged asymmetrically about the main axis. The asymmetric arrangement is provided by members of different stiffnesses, or irregular spacing of the members. The absorber mass (2) itself may be reduced adjacent to the resilient members.

22 Claims, 5 Drawing Sheets

WHERE $F_{nat}(vert) = \frac{1}{2\pi}\sqrt{\frac{6K}{M}}$

WHERE $F_{nat}(vert) = \frac{1}{2\pi}\sqrt{\frac{8K'}{M}}$

STIRLING ENGINE ASSEMBLY

CROSS REFERENCE TO RELATED APPLICATIONS

The present application claims priority to Great Britain Application No. 0127375.4, filed Nov. 14, 2001 and Great Britain Application No. 0203016.1, filed Feb. 8, 2002, which applications are incorporated herein fully by this reference.

The present invention relates to a Stirling engine assembly. In particular, the invention relates to an assembly suitable for use in a domestic combined heat and power (DCHP) unit.

Such a unit is intended to be used in a domestic environment in place of a conventional boiler. In such a situation, it is vital that the noise and vibration is kept to a very low level so as to be acceptable to a consumer.

The usual practice is to support an engine by mounting it on springs which isolate the vibration produced during normal engine operation. An example of a Stirling engine having such an arrangement is U.S. Pat. No. 4,400,941. To maximise the degree of isolation, a low stiffness mounting system is required. However, the implementation of this with compression springs can lead to instability.

According to the present invention, a Stirling engine assembly comprises a Stirling engine, a mounting frame on which the engine is mounted so that the axis along which reciprocating components of the engine reciprocate is vertical, in use, the engine being hung from the mounting frame by a plurality of tension springs.

By hanging the Stirling engine from springs, rather than resting it on the springs, the springs used can be low stiffness, high deflection springs. Thus, the conflict in the prior art between the need for stable support and the need for a low stiffness mounting system has been removed.

The springs from which the engine is suspended are particularly suitable for preventing transmission of low frequency vibrations. In order to improve damping across a larger range of frequencies, a rubber pad is preferably connected in series with each spring. The pad may be between the spring and the engine, between the spring and the mounting frame, or both. These rubber pads are particularly useful for attenuating high frequency vibrations.

The mounting frame is preferably connected to the lower half of the engine. This allows longer springs to be used than would be required if the mounting frame were to be connected to the upper part of the engine.

In order to provide additional radial stability for the Stirling engine within the surrounding suspension arrangement, and to provide a suitable seal for the combustion area, a housing for the burner, located above and around the upper dome of the engine, may incorporate a flexible annular guide between its inner lower face and the engine. This could be, for example, an 'O' ring, of a material suitable for use in this vibrating, high temperature environment. This would allow some lateral movement, so that the engine vibration would not cause damage, and prevent the transmission of unwanted forces, but would also maintain the stability of the engine. Alternative sealing arrangements, able to withstand the high temperature, high vibration environment could also be used.

The springs preferably have a free length of 100–150 mm and a total stiffness of between 0.6 and 0.9 kg/mm. The length of the springs when the engine is hung from them is equal to the length of the engine body ±20%.

The above described arrangement is a particularly advantageous suspension arrangement for the Stirling engine. However, further improvements in the design can be achieved by providing a vibration absorption arrangement to minimise the vibration of the engine, and hence reduce the burden on the suspension arrangement. Therefore, preferably, a vibration absorption mass is suspended from the engine on at least one resilient member and is arranged to provide an anti-phase force to the engine. The vibration absorption mass may be either suspended beneath the engine or may be an annular mass suspended so as to surround the engine. This latter arrangement can be advantageous to provide a Stirling engine with a shorter overall height.

In the case of a symmetrical annular vibration absorption mass, the pitching frequency tends to coincide with the vertical frequency due to a combination of the inertia of the mass around the horizontal axes and the rotational stiffness of the spring system about the same axes.

The degree of pitching is linked to the lack of diametric stiffness symmetry, the possible offset of the absorber mass from the spring stiffness centre, and the closeness of the excitation frequency to the vertical tuned frequency and the pitching frequencies. Therefore, the resilient members are preferably arranged asymmetrically about the main axis of the annular member. This can be done, for example, by providing resilient members of different stiffnesses. These are preferably arranged symmetrically on opposite sides of a first axis perpendicular to the main axis, and more preferably also arranged symmetrically on opposite sides of a second axis perpendicular to the main axis and the first axis.

Alternatively, the asymmetrical arrangement may be provided by grouping the resilient members close to a first axis perpendicular to the main axis. With this arrangement, the resilient members are preferably arranged symmetrically on opposite sides of the first axis.

In either case, the mass of the vibration absorption mass may be reduced adjacent to the horizontal axis of highest rotational stiffness as compared to the rest of the vibration absorption mass.

This asymmetric annular absorber mass forms an independent aspect of the invention which is broadly defined as a Stirling engine assembly comprising a Stirling engine, a mounting frame on which the engine is mounted so that the axis along which the reciprocating components reciprocate is vertical, in use, wherein an annular absorption mass surrounds the Stirling engine and is suspended from the engine on a plurality of resilient members, to provide an anti-phase force to the engine, the resilient members being arranged asymmetrically about the main axis of the annular member.

This arrangement can be used when the engine is hung from springs according to the first aspect of the invention, or is suspended from some other resilient mounting.

An example of a Stirling engine assembly in accordance with the present invention will now be described with reference to the accompanying drawings, in which.

The Stirling engine assembly comprises a Stirling engine 1 that is well known in the art. The Stirling engine has displacer and power pistons, both of which are arranged to reciprocate in a vertical direction. This produces a net vertical vibration of the Stirling engine 1 itself.

In order to reduce this vibration, a vibration absorber mass 2 is supported by a number of compression springs 3 both above and below the absorber mass 2. This arrangement is housed in a housing 4 which is rigidly fixed to the bottom of the Stirling engine 1. The mass 2 and springs 3 are tuned so that when the Stirling engine 1 is operating at its normal operating frequency, the absorber mass 2 vibrates as closely as possible in anti-phase to the Stirling engine 1. As a result of this, the overall vibration of the Stirling engine 1 and housing 4 is greatly reduced.

The current arrangement incorporates eight compression springs 3 above and eight compression springs 3 below the 10.5 kg (±10%) isolator mass 2. These springs have, for example, a free length of 67 mm, and a stiffness of 66.25 N/mm (±10%). The absorber is tuned to absorb vibrations of frequency, 48 Hz to 52 Hz, (minimum vibration at 50.25 Hz).

Figure 2B:
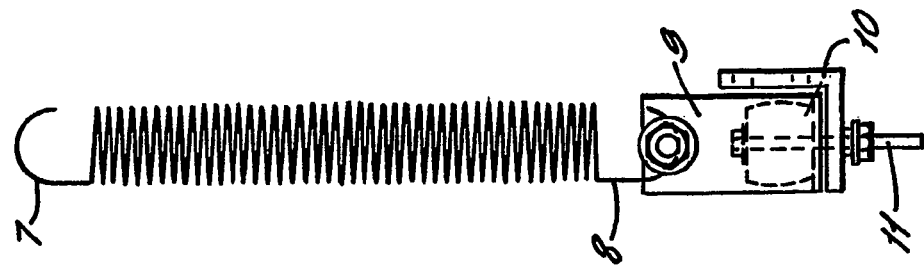
FIG. 2B is a side elevation of the arrangement shown in FIG. 2A.
Figure 2A:
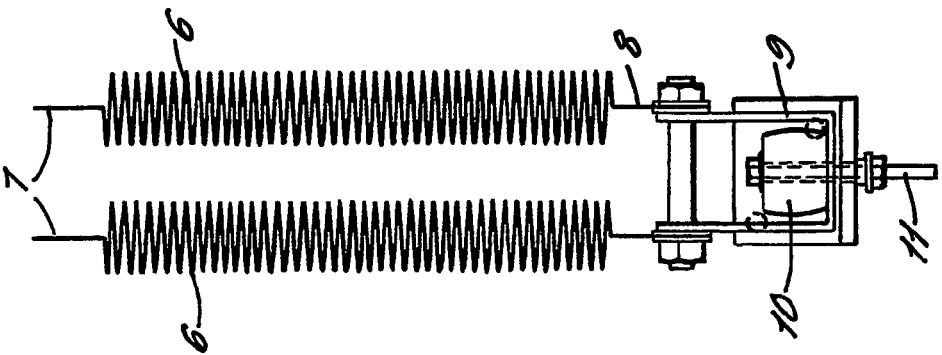
FIG. 2A is a front elevation of part of the mounting assembly including two springs.
Figure 1:
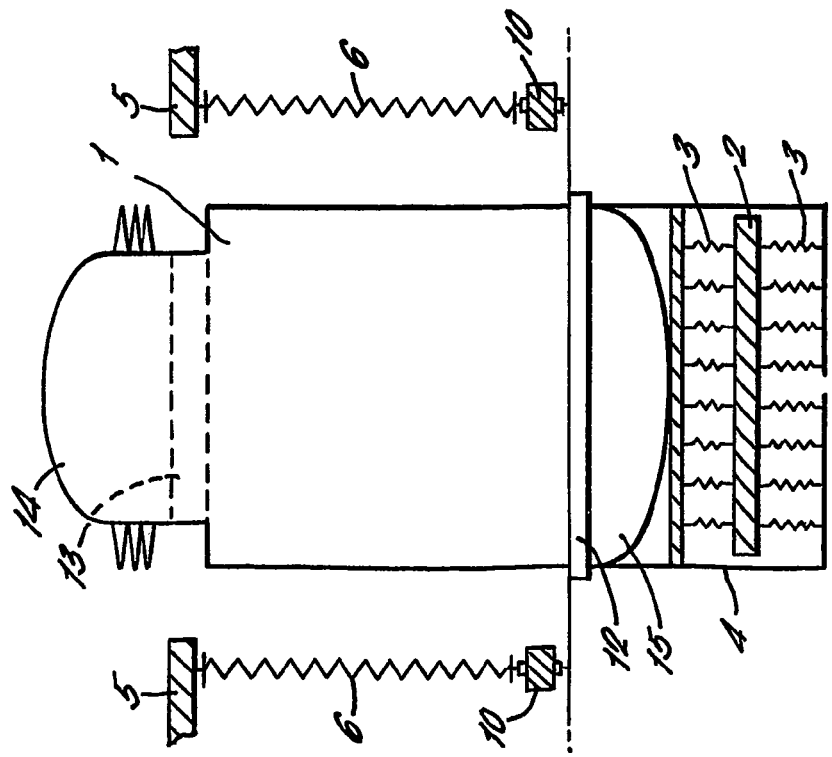
FIG. 1 is a schematic cross-section of the assembly.

The above described assembly of Stirling engine 1 and housing 4 is mounted to a mounting frame 5 which surrounds the head of the engine as shown in FIG. 1. The engine 1 and housing 4 are suspended from the mounting frame by a plurality of mounting assemblies spaced around the Stirling engine, one of which is shown in FIGS. 2A and 2B. Each mounting assembly comprises a pair of tension springs 6 provided at their upper ends with a hook 7 for attachment to the mounting frame 5. A second hook 8 attaches the lower end of each spring to a frame 9.

The thickness of the spring wire is chosen to be sufficient to support the weight of the engine 1 and absorber mass 2, which could be between 40 and 80 kg, but is typically 60 kg. In this case the wire diameter is typically 2.4 mm.

In order to provide the optimum suspension isolation, reducing low frequency vibration, the springs need to be as long as possible, with the mounting points as far apart as the design will permit. In this case, the upper mounting frame 5 is located immediately below the engine burner housing, and a lower engine mounting ring 12 is located on the lower engine flange. The extended spring length is then approximately equal to the length of the engine body (typically 190 mm) which excludes a cooler 13, heat transfer head 14 and back end dome 15 (as shown in FIG. 1). In addition, care must be taken to ensure that the spring natural (surge) frequency does not coincide with the engine running frequency, or its harmonics, which would result in unacceptable resonance.

In the current configuration, with 6 to 12 springs (typically 8), arranged in pairs, located with regular spacing around the engine, the free length of the springs is preferably 100 to 150 mm (typically 127 mm). The total spring stiffness is between 0.6 and 0.9 kg/mm (typically 0.75 kg/mm), giving each spring a stiffness (spring rate), in this configuration, of typically 0.09 kg/mm.

Seated in each frame 9 is a rubber element 10. This rubber element 10 bears a mounting bolt 11 by virtue of which the mounting assembly attaches to a mounting ring 12 on the Stirling engine 1. Thus, any vibrations in the Stirling engine 1 are transmitted via the bolt 11, to the rubber element 10, into the frame 9 and then through the springs 6 to the mounting frame 5.

As an alternative, or in addition to the rubber element 10 at the bottom of each spring a rubber element may be provided at the top of each spring.

The stiffness per rubber element 10 based on four sets of springs, is, for example, 110 N/mm. The rubber elements are designed to remove the high frequency content and hence the quoted stiffness is adequate and the strain is kept within sensible levels bearing in mind the reduction in performance of the rubber at elevated temperatures.

The higher frequency vibrations tend to be attenuated by the rubber element 10, while the lower frequency vibrations are attenuated by the springs 6, such that the vibrations experienced by the mounting frame 5 is negligible, and is within the acceptable limits for the DCHP unit.

Figure 3:
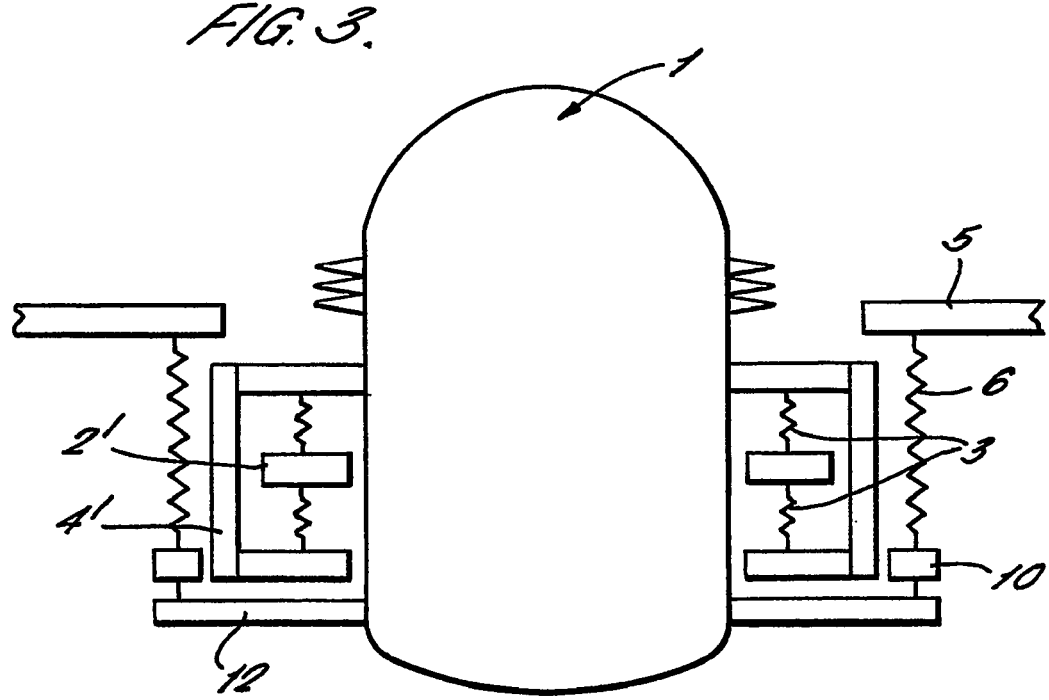
FIG. 3 is a schematic cross-section of an alternative assembly to that shown in FIG. 1.

An alternative assembly to that shown in FIG. 1 is shown in FIG. 3. In this arrangement, the housing 4' is mounted so as to surround the Stirling engine 1, rather than being suspended beneath the engine 1 as in FIG. 1. In this case, the absorber mass 2' is annular and surrounds the Stirling engine. This embodiment requires that the mounting ring 12 has a considerably larger diameter than that of FIG. 1. However, the overall height of the apparatus is reduced, and hence this design is useful when elevational space is limited. Otherwise, the arrangement is as shown in FIG. 1 and the same reference numerals have been used to designate the same components.

Figure 4:
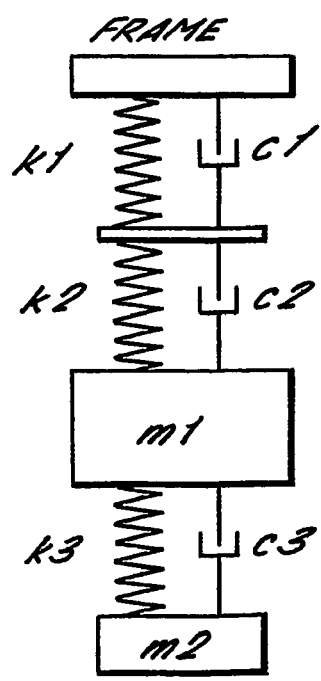
FIG. 4 is a schematic diagram of the dynamics of the suspension arrangement.

The dynamics of the assembly are shown in FIG. 4. In this figure the elements are as follows:

m1—main engine mass,
m2—absorber mass (2),
k1—tension spring (6) stiffness×no. of tension springs,
c1—damping value associated with tension spring arrangement,
k2—compression stiffness of rubber element (10)×no. of rubber elements,
c2—damping value associated with compression rubber element,
k3—compression spring (3) stiffness×no. of compression springs (typically 16),
c3—damping value associated with compression springs and air movements around absorber mass.

Modified versions of the annular absorber mass of FIG. 3 are described with reference to FIGS. 5 to 8.

Figure 5A:
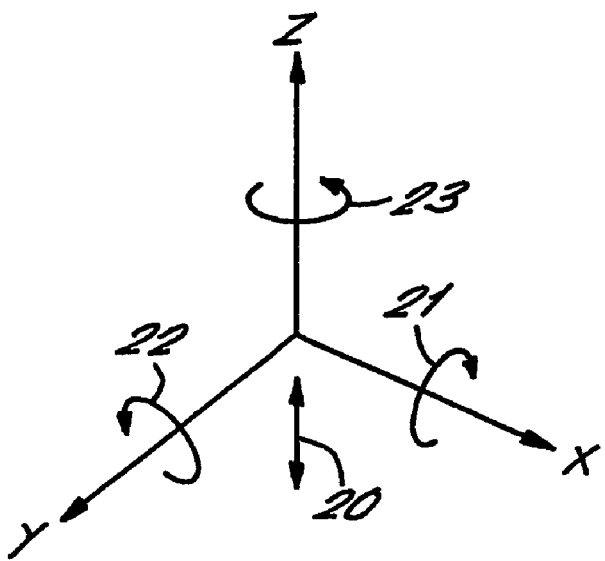
FIG. 5A is a diagram showing the various modes of vibration of the annular absorption mass.
Figure 5B:
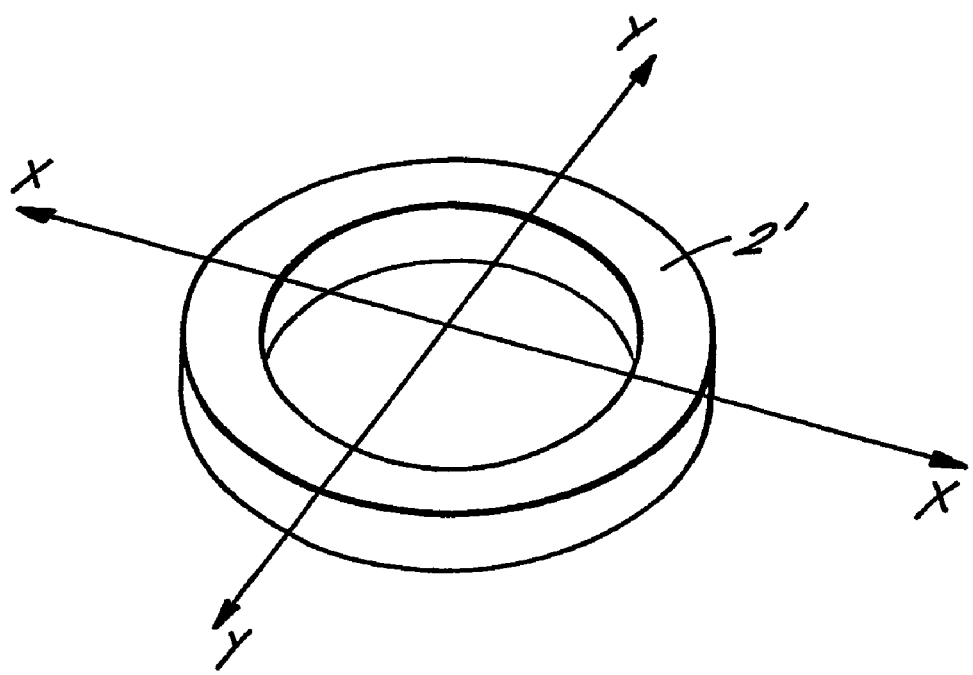
FIG. 5B is a diagram showing the axes of the absorption mass.

FIGS. 5A and 5B define an axis system for the annular mass. The X, Y and Z axes are mutually orthogonal, with the X and Y axes being horizontal axes in the plane of the annular mass intersecting at the centre of the annular mass, and the Z axis being the vertical axis extending from the centre of the absorber mass 2'. The natural excitation frequency causes vertical reciprocation in the direction of arrow 20. However, the pitching frequency tends to coincide with the vertical frequency causing pitching about the X and Y axes as shown by arrows 21 and 22 respectively. The annular absorber mass also rotates about the Z axis as shown with arrow 23. In order to reduce the pitching about the X and Y axes, an asymmetrical arrangement of springs, or an asymmetry of absorber mass inertia is proposed.

Figure 6:
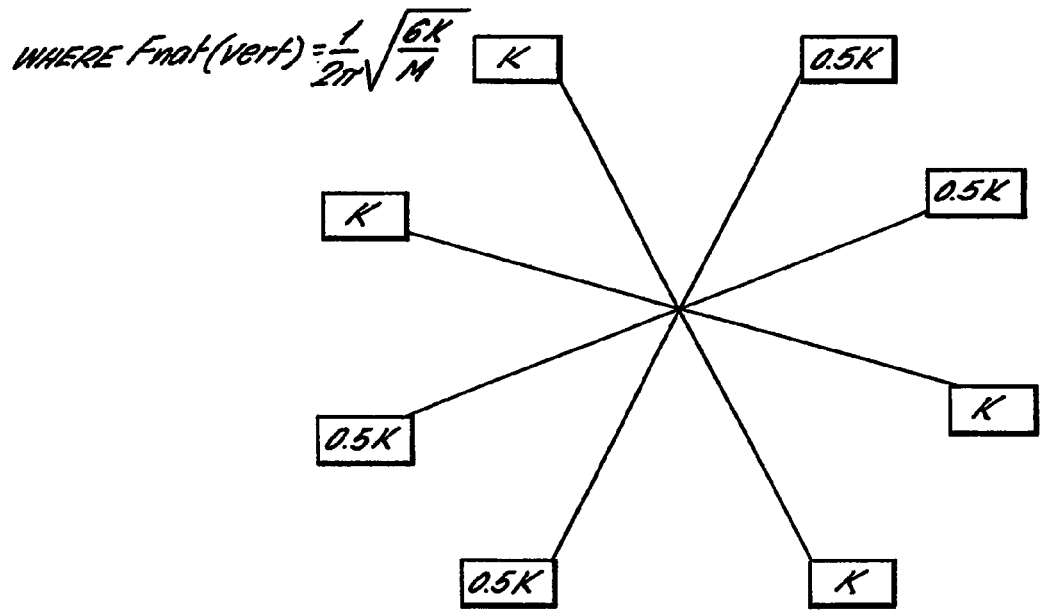
FIG. 6 is a schematic diagram showing the first spring arrangement.

The first example of this is shown in FIG. 6. This arrangement is generally suitable for the situation where the rotational inertias of the absorber mass about the X and Y axes are equal. In this case, the absorber mass 2' has a uniform cross-section and a uniform mass. By arranging the springs as shown in FIG. 6, where four of the springs have a stiffness K, while the remaining four have a stiffness of 0.5K it should be noted that this provides a stiffness variation around the periphery of the mass, but not across the mass as the stiffness of the springs is symmetrical on opposite sides of the X and Y axes. The spring stiffness pattern is replicated above and below the absorber mass. In the second arrangement, both the spring stiffness and the absorber mass rotating inertia are asymmetric.

Figure 7:
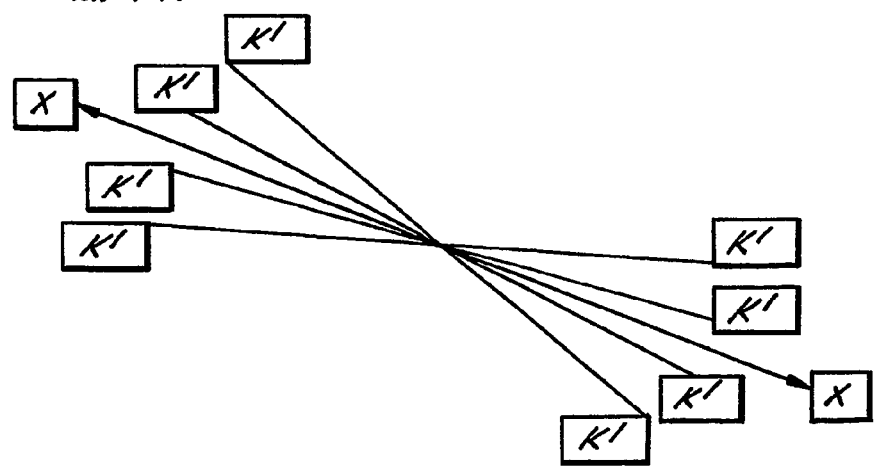
FIG. 7 is a schematic diagram showing a second spring arrangement.
Figure 8:
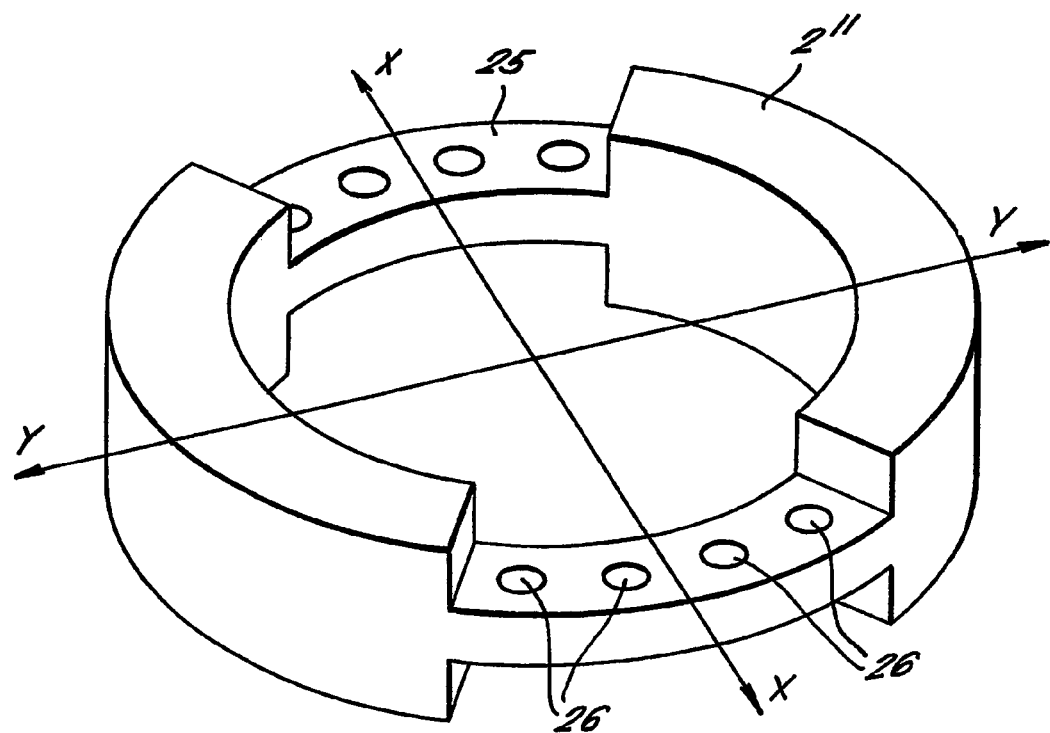
FIG. 8 is a perspective view of the annular mass suitable for use in the arrangement of FIG. 7.

A second arrangement is shown in FIG. 7 which is particularly suitable when the rotational inertias of the absorber annulus are different about the X and Y axes. In this case, eight springs of equal stiffness K' are provided but are grouped by the axis of highest inertia (X) consistent with the need to maintain sufficient stability during operation. In this case, an annular mass 2" is provided which essentially has a pair of cutout portions 25 at opposite sides of annular mass 2" and the eight springs are arranged to be attached to mounting points 26 above and below each cutout portion.

What is claimed is:

1. A Stirling engine assembly comprising a Stirling engine, a mounting frame on which the engine is mounted so that the axis along which the reciprocating components reciprocate is vertical, in use, the engine being hung from the mounting frame by a plurality of tension springs.

2. An assembly according to claim 1, wherein a rubber pad is connected in series with each spring.

3. An assembly according to claim 1, wherein the springs have a free length of between 100 and 150 mm.

4. An assembly according to claim 1, wherein the springs have a length, when the Stirling engine is hung from them, equal to the length of the engine body ±20%.

5. An assembly according to claim 1, wherein the springs have a total stiffness of 0.6–0.9 kg/mm.

6. An assembly according to claim 1, wherein the mounting frame is connected to the lower half of the engine.

7. An assembly according to claim 1, wherein a vibration absorption mass is suspended from the engine on at least one resilient member and is arranged to provide an anti-phase force to the engine.

8. An assembly according to claim 7, wherein the vibration absorption mass is annular and surrounds the Stirling engine.

9. An assembly according to claim 8, wherein the resilient members are arranged asymmetrically about the main axis of the annular member.

10. An assembly according to claim 9, wherein the asymmetrical arrangement is provided by resilient members of different stiffnesses.

11. An assembly according to claim 10, wherein the resilient members are arranged symmetrically on opposite sides of first axis perpendicular to the main axis.

12. An assembly according to claim 11, wherein the resilient members are also arranged symmetrically on opposite sides of a second axis perpendicular to the main axis and the first axis.

13. An assembly according to claim 9, wherein the asymmetrical arrangement is provided by grouping the resilient members close to a first axis perpendicular to the main axis.

14. An assembly according to claim 13, wherein the resilient members are arranged symmetrically on opposite sides of the first axis.

15. An assembly according claim 9, wherein the mass of the vibration absorption mass is reduced adjacent to the resilient members as compared to the rest of the vibration absorption mass.

16. A Stirling engine assembly comprising a Stirling engine, a mounting frame on which the engine is mounted so that the axis along which the reciprocating components reciprocate is vertical, in use, wherein an annular absorption mass surrounds the Stirling engine and is suspended from the engine on a plurality of resilient members, to provide an anti-phase force to the engine, the resilient members being arranged asymmetrically about the main axis of the annular member.

17. An assembly according to claim 16, wherein the asymmetrical arrangement is provided by resilient members of different stiffnesses.

18. An assembly according to claim 17, wherein the resilient members are arranged symmetrically on opposite sides of first axis perpendicular to the main axis.

19. An assembly according to claim 18, wherein the resilient members are also arranged symmetrically on opposite sides of a second axis perpendicular to the main axis and the first axis.

20. An assembly according to claim 16, wherein the asymmetrical arrangement is provided by grouping the resilient members close to a first axis perpendicular to the main axis.

21. An assembly according to claim 20, wherein the resilient members are arranged symmetrically on opposite sides of the first axis.

22. An assembly according to claim 16, wherein the mass of the vibration absorption mass is reduced adjacent to the resilient members as compared to the rest of the vibration absorption mass.

* * * * *